United States Patent [19]

Gataora

[11] Patent Number: 5,697,551
[45] Date of Patent: Dec. 16, 1997

[54] HEATING SYSTEM OF THE TYPE FOR APARTMENTS OR OFFICES IN BUILDINGS

[76] Inventor: Santokh Singh Gataora, 81 Mansell Road, Greenford, Middlesex, United Kingdom, UB6 9EJ

[21] Appl. No.: 693,053

[22] PCT Filed: Dec. 15, 1995

[86] PCT No.: PCT/GB95/02941

§ 371 Date: Oct. 4, 1996

§ 102(e) Date: Oct. 4, 1996

[87] PCT Pub. No.: WO96/20375

PCT Pub. Date: Jul. 4, 1996

[30] Foreign Application Priority Data

Dec. 23, 1994 [GB] United Kingdom ............... 9426145

[51] Int. Cl.$^6$ .................................................. F23N 1/08
[52] U.S. Cl. .................... 236/9 A; 236/20 R; 237/8 R
[58] Field of Search .................... 236/9 A, 94, 20 R; 237/8 R

[56] References Cited

U.S. PATENT DOCUMENTS

| | | | |
|---|---|---|---|
| 4,049,044 | 9/1977 | Cohen | 236/94 |
| 4,230,267 | 10/1980 | Dotschkal et al. | 236/9 A |
| 4,335,848 | 6/1982 | Eidejus | 237/8 R |
| 4,364,512 | 12/1982 | Morrison | 236/9 A |
| 4,437,771 | 3/1984 | Cazzaniga | 236/94 |
| 4,483,479 | 11/1984 | Snell | 236/9 A |
| 4,834,284 | 5/1989 | Vandermeyden | 236/20 R |
| 5,056,712 | 10/1991 | Enck | 236/20 R |

FOREIGN PATENT DOCUMENTS

WO92/06336 of 0000 WIPO.

Primary Examiner—Henry A. Bennett
Assistant Examiner—Gregory Wilson
Attorney, Agent, or Firm—Larson & Taylor

[57] ABSTRACT

A water heating system for a number of apartments or offices 10 each having a water store 15 for receiving hot water from a common boiler 12. The system includes a temperature sensor S2 for sensing the temperature of incoming water from the boiler, with a valve V1 between the temperature sensor S2 and the water store 15. A further temperature sensor S1 senses the temperature of water within the store 15. An electronic controller 30 controls the flow of water via valves V1, V2 dependent on the temperature detected by both the first and second sensors to prevent water being received by the store when the temperature differential is too small. This avoids the risk of reduction of the water temperature within the store 15, and meter 21 will not register utilization under these circumstances as valve V2 allows the return of the water other than via store 15.

12 Claims, 3 Drawing Sheets

HEATING SYSTEM OF THE TYPE FOR APARTMENTS OR OFFICES IN BUILDINGS

This application is based on International Application PCT/GB95/02941, having international filing date of Dec. 15, 1995, and a priority date of Dec. 23, 1994.

The invention relates to a heating system of the type used for supplying a number of separate flats, apartments or offices in a building from a common boiler plant. Each apartment may be billed separately for the heat utilized.

According to the invention there is provided a heating system having a boiler for supplying heated water to a number of apartments, offices or the like and each apartment or the like including (a) first sensor means for sensing the current water temperature in that respective apartment; (b) second sensor means for sensing the arriving water temperature to that apartment; (c) first control means for controlling the incoming water to allow this to pass for utilization only when the temperature thereof is above a selected temperature for that apartment; and (d) second control means for returning the incoming water without utilization when the temperature thereof is below a selected temperature for that apartment and wherein each apartment includes a water store for receiving hot water from the boiler, the first sensor means sensing the temperature within the water store.

Further according to the invention there is provided a method of heating a number of apartments, offices or the like from a common boiler, the method including: sensing the current water temperature in a water store in a respective apartment; sensing the incoming water temperature received by that apartment controlling the incoming water in that apartment to allow this to pass for utilization only when the temperature thereof is above a selected temperature; and controlling in that apartment the incoming water so as to return it without utilization when the temperature thereof is below a selected temperature.

The invention will now be described by way of example with reference to the accompanying drawings in which.

Figure 1:
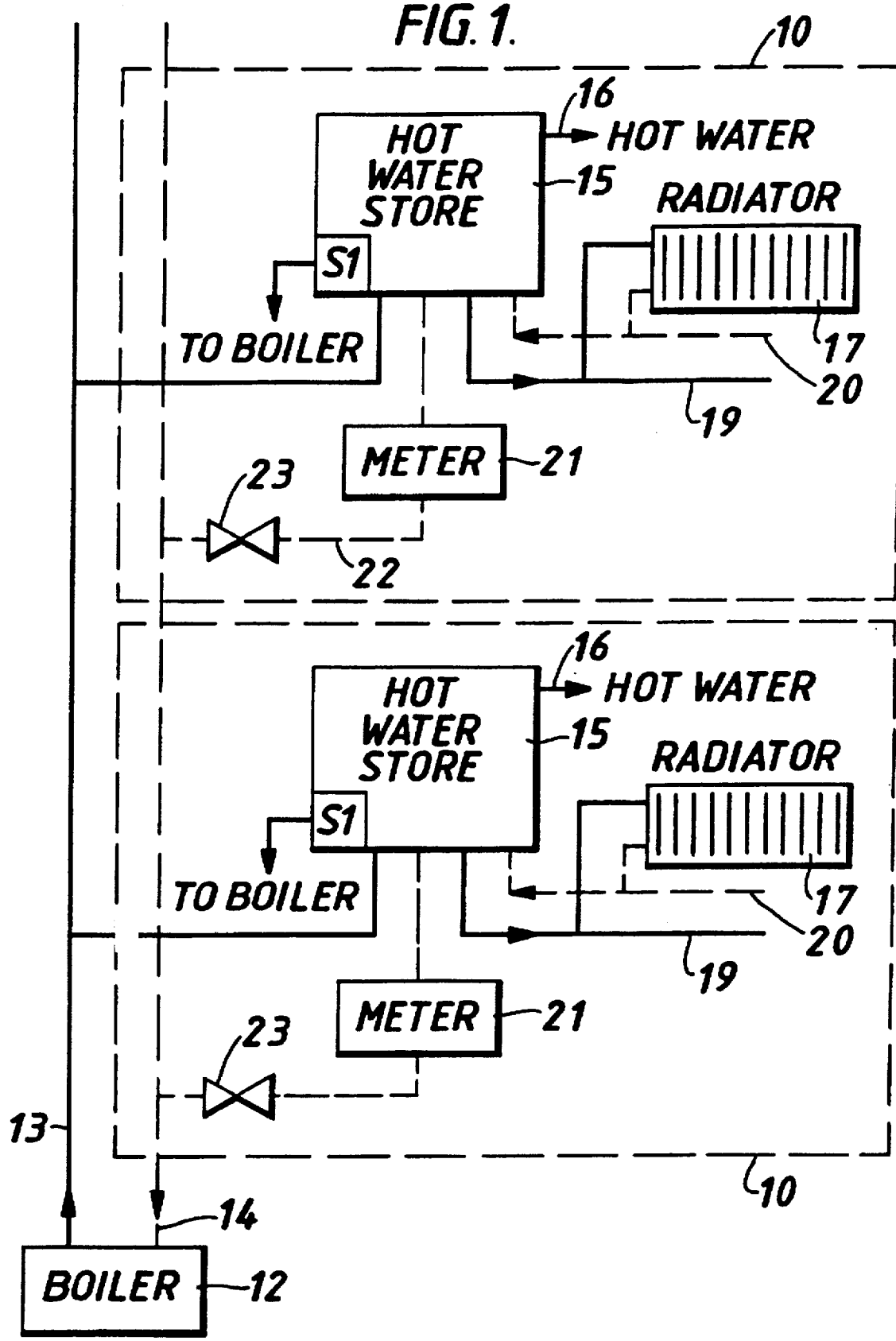
FIG. 1 shows a system for heating a number of apartments using a common boiler.

FIG. 1 shows a system including a number of heating arrangements 10 connected to a common boiler 12 via pipes 13, 14. Although only two arrangements are shown, in practice the number utilized will be equal to the number of apartments in the building, e.g. 40.

Each arrangement 10 includes a hot water store 15 with associated thermostat S1. Hot tap water can be drawn via outlet 16 and water for radiators 17 are provided via pipes 19, 20. A meter 21 is provided on the return pipe 22 which also includes closure valve 23.

The hot water from boiler 12 is received by each apartment and the hot water store 15 therein will contain a reserve of this hot water for heating the tap water and radiators.

Thermostat S1 will be set to a desired temperature and will indicate to the boiler when temperature in the store has fallen so that the common supply will be heated further. The hot water for the taps will typically be heated within the store via coils from a cold source to avoid utilizing the water from the boiler itself. The radiator water is circulated and passes back to the hot water store. The meter 21 measures the water circulation or heat or the user is charged accordingly.

Problems with levels of demand can cause operational problems in that if the boiler cannot cope with demand, or if the water in the pipes 13 and 14 is cold, cool water could be circulated through the apartment system can be paid for. Also, if the water store temperature is relatively high this heat could be 'robbed' by the boiler water. To avoid these problems, it may be necessary to keep the boiler water temperature and the water temperature in pipes 13 and 14 artificially high so that on many occasions heat is being wasted when demand is low as the hot water will be continually circulating in the pipework (i.e. pipes 13 and 14 would be joined at the end of the run).

Figure 2:
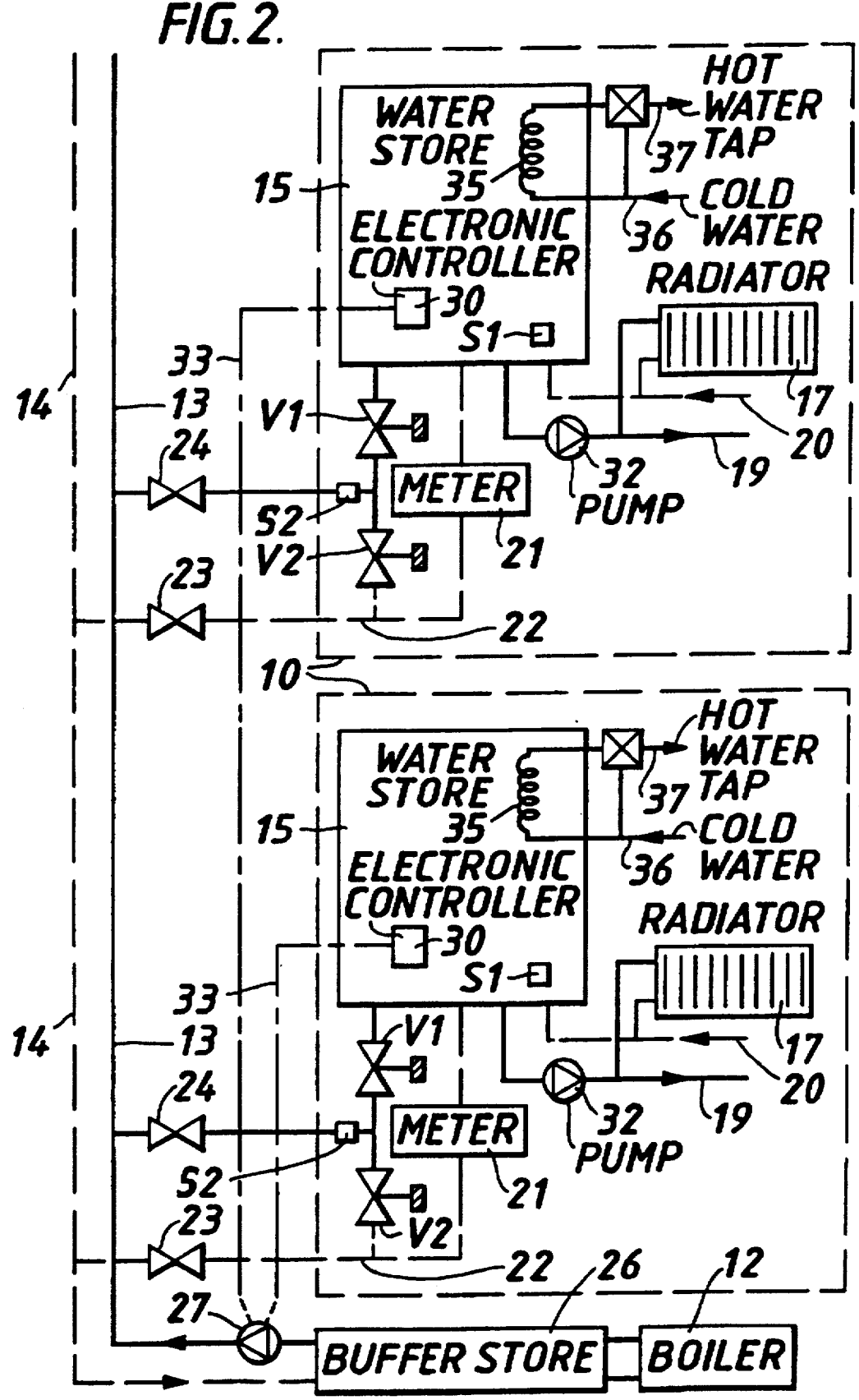
FIG. 2 shows a modified system more able to cope with demand requirements.

In the modified system of FIG. 2, additional measures are taken to avoid these problems.

With the water store 15 is now provided an electronic controller 30 which is connected to two thermostats (S1 and S2) to allow the water store temperature (T1) to be determined by sensor S1 and the temperature T2 determined by S2 for the incoming water from the boiler 12 received via buffer store 26. The electronic controller 30 can control the water pump 27 by cable connection 33 thereto. Electric valves V1 and V2 are provided and controlled by controller 30. The system also includes a pump 32 for the radiator circulation. A water coil 35 receives a supply of cold water at inlet 36 and coil 35 acts as a heat exchanger to heat the water which passes from outlet 37 to taps for basins, bath and so on. A manual thermostatic mixer 38 can adjust the heated water temperature.

With the system now described, when the water store temperature drops (when water is being drawn, for example) this will be sensed by S1 and a signal sent to the boiler plant pump 27 to pump water to the water store 15. If there are no requests for water resulting from a drop in temperature the water in pipes 13 and 14 does not circulate. S2 the sensor specific to that apartment senses the incoming water temperature when a request is generated and only allows V1 to open if this incoming water temperature is sufficiently high. V2 operates under the controller 30 to return this water should it be too cold. V2 only returns water following a request for hot water (sensed by S1). Normally water does not return via V2.

Figure 3:
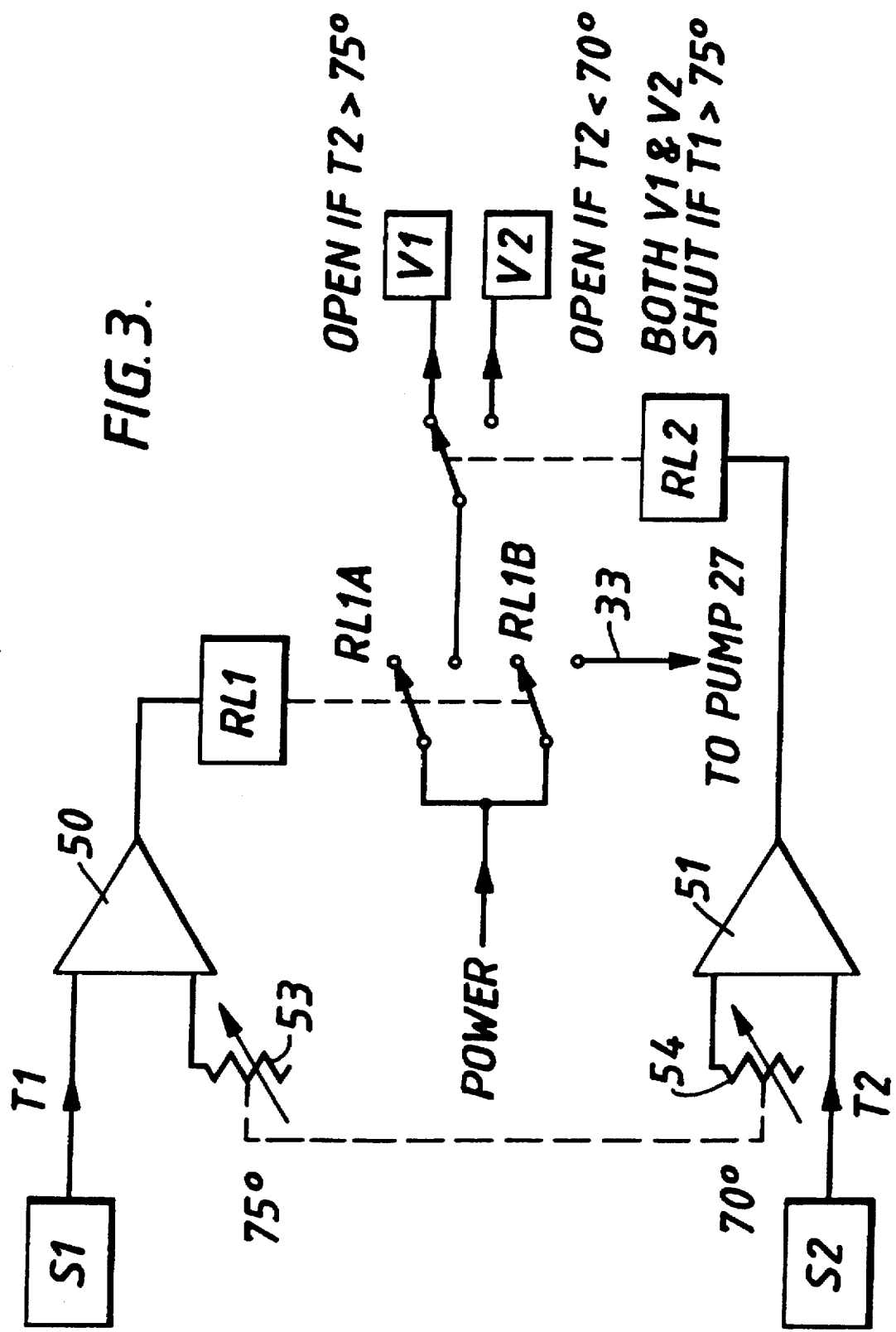
FIG. 3 shows an embodiment of the electronic controller of FIG. 2 in more detail.

Typically S1 and S2 can be ganged so that a higher temperature setting on S1 will require a higher setting on S2 also. It is to be noted that there is a sensor S1 and S2 associated with each apartment and the control of valves V1 and V2 is taken by the local controller. An arrangement for the controller 30 is shown in FIG. 3.

The temperature T1 is converted by the sensor S1 to an electrical signal which is received by comparator 50. The output of comparator 50 controls the coil of a relay RL1.

The temperature T2 is converted by the sensor S2 to an electrical signal which is received by comparator 51. The output of comparator 51 controls the coil of a relay RL2.

The comparator setting is controlled by variable resistor 53 which typically is ganged to variable resistor 54 but offset thereto. Hence, for example, a temperature setting of 75° C. can be set for the comparator 50 and a setting of 70° for comparator 51. Power is supplied to relay contacts RL2A via RL1 contacts RL1A and also to operate the pump 27 via contacts RL1B utilizing connection cable 33.

Hence in operation when the water store temperature falls below the set value (e.g. 75° C.) then RL1 operates and dependent on the sensed temperature T2 at sensor S2 measuring the incoming water temperature either the valve V1 will open if the sensed temperature is high enough to raise the temperature in the water store or will cause valve V2 to open instead to return the water to the boiler system to be reheated (without it actually being passed through the water store). This avoids the user having to pay for water that is below the desired temperature. Nor does it allow the heat already paid for to be 'robbed' by heating the returning water. Hence the meter 21 in the return path from the water store will not be active in this improved system under these circumstances. Nor does it require the supply pipe 13 and the return pipe 14 to be permanently heated to supply water at correct temperature, hence saving on energy.

The controller could be configured to allow a preselected temperature band to be used rather than a specific temperature to avoid unnecessary switching about a specific temperature.

As the decisions on water flow and temperature are effected by the controller associated with a particular apartment, it is possible for the temperature settings in one apartment to differ from that required in another apartment. The arrangement also has the advantage that utilizing local decisions prevents the need for water to continuously circulate in pipes 13 and 14 which would require constant heating, a wasteful technique.

I claim:

1. A heating system having a boiler for supplying heated water to a number of apartments, offices or the like and each apartment or the like including (a) first sensor means for sensing the current water temperature in that respective apartment; (b) second sensor means for sensing the arriving water temperature to that apartment; (c) first control means for controlling the incoming water to allow this to pass for utilizing only when the temperature thereof is above a selected temperature for that apartment; and (d) second control means for returning the incoming water without entering that apartment when the temperature thereof is below a selected temperature for the apartment, and wherein each apartment includes a water store for receiving hot water from the boiler, the first sensor means sensing the temperature within the water store.

2. A system as claimed in claim 1 wherein the first control means includes a first valve between the incoming water and the water store to prevent passage of water thereto when the sensed incoming water temperature is below a preselected temperature and the second control means includes a second valve operable to allow water to be returned without entering that respective apartment when the sensed incoming water temperature is below a preselected temperature.

3. A system as claimed in claim 1 wherein the control means is configured to allow selection of a water temperature such that there is a differential between the temperature at which incoming water is allowed to pass for utilization and the temperature at which water is returned without entering.

4. A system as claimed in claim 1 including circulation means for circulating water for use by any apartment, the circulation means being operable only when a request from an apartment is made following the sensing of water temperature by the first sensor means.

5. A system as claimed in claim 4 wherein the first sensor means is adapted to be able to detect a selectable different temperature relative to that of a different apartment such that individual apartments have the facility to request water at different selected store temperatures independent of other apartment requirements.

6. A system as claimed in claim 1 in which a boiler buffer store is provided to allow common buffer water storage for the water heated by the boiler prior to circulation to apartments.

7. A system as claimed claim 1 including a meter for each apartment or office and operable only when returning water has been utilized.

8. A system as claimed in claim 1 wherein heat exchange means are provided to provide heated water from taps or the like in addition to circulating water for heating purposes.

9. A method of heating a number of apartments, offices or the like from a common boiler, the method including: sensing the current water temperature in a water store in a respective apartment; sensing the incoming water temperature received by the apartment; controlling the incoming water in that apartment to allow said incoming water to pass for utilization only when the temperature thereof is above a selected temperature; and controlling in that apartment the incoming water so as to return the incoming water without entering that apartment when the temperature of the incoming water is below a selected temperature.

10. A method as claimed in claim 9 including selecting a sensed temperature in the water store higher than that selected on the incoming water so that water is passed for utilizing only when this differential in temperature is measured.

11. A method as claimed in claim 10 including circulating water through the system only when a request is made for hot water from an individual apartment following the sensing step.

12. A method as claimed in claim 10 wherein the sensing steps can be utilized to select a different temperature relative to that of a different apartment such that individual apartments have the facility to request water at different selected store temperatures independent of the requirements of other apartments.

* * * * *